United States Patent [19]

Regehr

[11] 4,374,071

[45] Feb. 15, 1983

[54] COUNTERFLOW COOLING TOWER

[76] Inventor: Ulrich Regehr, 51 Aachen, Susterfeld 65, Fed. Rep. of Germany

[21] Appl. No.: 292,162

[22] Filed: Aug. 12, 1981

[30] Foreign Application Priority Data

Aug. 12, 1980 [DE] Fed. Rep. of Germany ....... 3030395
Aug. 12, 1980 [DE] Fed. Rep. of Germany ....... 3030439

[51] Int. Cl.$^3$ .............................................. B01F 3/04
[52] U.S. Cl. ............................ 261/109; 55/257 R; 261/110; 261/161; 261/DIG. 11; 261/DIG. 77
[58] Field of Search ........ 261/109, 110, 112, 158–161, 261/DIG. 11, DIG. 77, 111; 55/257 R; 165/DIG. 1

[56] References Cited

U.S. PATENT DOCUMENTS

| | | | |
|---|---|---|---|
| 2,809,818 | 10/1957 | Munters | 261/DIG. 11 |
| 2,825,210 | 3/1958 | Carr | 261/DIG. 11 |
| 2,882,996 | 4/1959 | Lanier et al. | 261/DIG. 11 |
| 3,013,781 | 12/1961 | Haselden | 261/112 |
| 3,313,533 | 4/1967 | Powers | 261/112 X |
| 3,345,048 | 10/1967 | Phelps | 261/DIG. 11 |
| 3,997,635 | 12/1976 | Hallgren | 261/DIG. 77 |
| 4,119,140 | 10/1978 | Cates | 261/DIG. 11 |

FOREIGN PATENT DOCUMENTS 644976 10/1950 United Kingdom ................ 261/112

*Primary Examiner*—Richard L. Chiesa
*Attorney, Agent, or Firm*—Curtis, Morris & Safford

[57] ABSTRACT

A counterflow cooling tower includes a casing having cooling air inlet openings formed at its lower end and cooling air outlet openings formed at its upper end, a contact body positioned in the casing and formed from a plurality of contact layers arranged in banks and defining a plurality of water and air flow channels therebetween providing communication between the air inlet and outlet openings, a water distribution installation positioned above the contact body for supplying warm water to be cooled to the channels, channel caps on top of only some of the channels fitted geometrically to adjacent contact layers and covering some of the channels against water from the water distribution installation, and an air supply installation for supplying cooling air from the air inlet openings through substantially all of the channels to the air outlet openings, whereby the temperature and moisture-content of air supplied to the channels to which warm water is supplied are increased while the temperature of air supplied to the other channels is increased by heat transfer through adjacent layers of the contact body without substantially changing the moisture-content thereof. The water distribution installation may include elongated spray nozzles installed in the areas between the channel caps and running at an angle to the channels over the extent of the banks.

11 Claims, 6 Drawing Figures

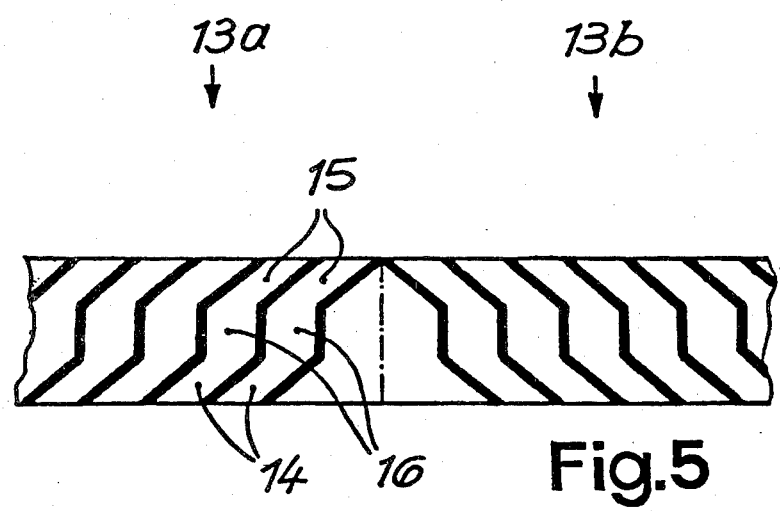
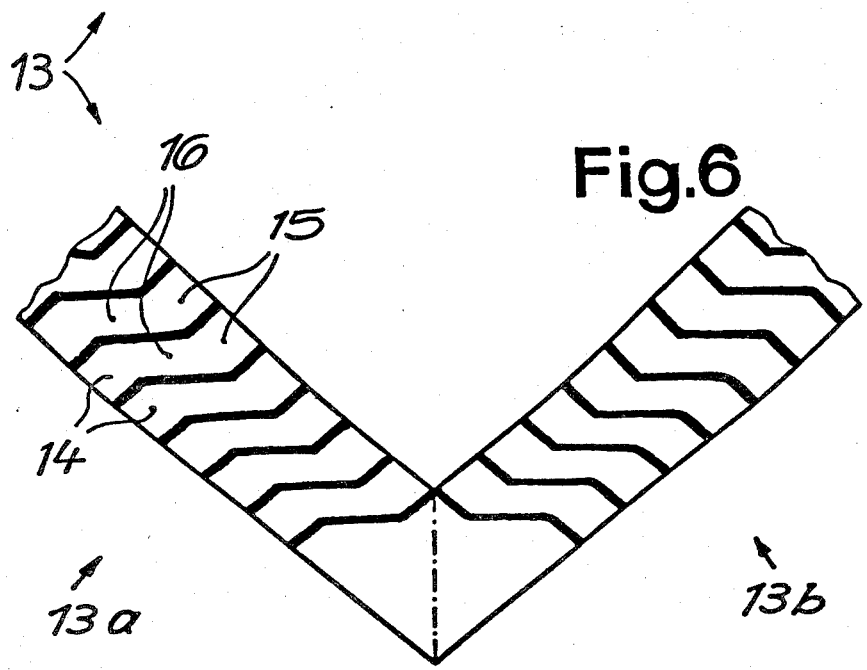

COUNTERFLOW COOLING TOWER

The invention concerns a counterflow cooling tower, in particular a recooling cooling tower for steam generated power stations, having a cooling tower casing, a contact body positioned in the casing with a number of water and air flow channels for the cooling air, a water distribution installation with spray nozzles, controllable individually or in groups, for the supply of the water to be cooled, at least one cooling air entrance below the contact body and at least one cooling air exit up above the contact body. The cooling tower contact body includes a number of container plates or contact layers which are installed with intermediate gaps and arranged in banks. The intermediate gaps between the container plates or contact layers form the flow channels and the container plates comprise the sides of respective flow channels. All of the flow channels or, alternatively, a selected number of flow channels, preferably each second flow channel, can be sprinkled with the water to be cooled by means of the water distribution installation.

The well-known counterflow cooling towers having the features described above function according to a special principle when only the flow channel sides of each second flow channel are sprinkled with the water to be cooled. In the flow channels of which the flow channel sides are sprinkled with the water to be cooled, the cooling air will increase in temperature and consequently, it will simultaneously become saturated with steam. In the unsprinkled flow channels the cooling air will equally increase in temperature but it cannot absorb any steam and its moisture content is therefore far from the saturation point. In addition, the layout is designed in such a way that as a result of the mixing of the saturated and unsaturated cooling air no fog or vapor formation occurs.

In the known counterflow cooling towers of the type described above, the container plates are flat plates, installed at a certain distance from each other and thereby defining the flow channels. Above each flow channel a spray nozzle of the water distribution installation has been mounted.

In the case of large counterflow cooling towers, e.g. normal recooling cooling towers for steam generated power stations, this will result in a disturbingly large number of spray nozzles. Their arrangement and installation are expensive. The nozzles require maintenance and care. Their diameter cannot be reduced at will because they have to process considerable amounts of water. Consequently, serious constraints govern the layout of the known counterflow cooling towers which lead further to spatial and thermodynamic disadvantages.

The object of the invention is to simplify the known counterflow cooling towers described above and to design them in such a way that the width of the flow channels can be freely chosen according to the overall requirements to be taken into account for the layout of the counterflow cooling tower and without regard to the diameter of the spray nozzles to be installed, thus making it possible to install a large number of container plates inside a similar counterflow cooling tower.

The counterflow cooling tower according to the invention, which meets this object, is characterized by the fact that at least individual flow channels present alternatingly open and closed flow channel caps to the water distribution installation, that the sides of the flow channel caps are at least fitted geometrically to the corresponding container plates, and that the spray nozzles of the water distribution installation are installed in the area between the flow channel caps. "Fitted at least geometrically" means, in this context, that the cooling air can enter the flow channels practically undisturbed whether or not the container plates and the flow channel caps are structurally connected.

According to the invention, the spray nozzles of the water distribution installation are no longer parallel to the container plates above the individual flow channels. Rather, they run at an angle or diagonally to the flow channels over the extent of the container plate banks. The number of spray nozzles is hereby reduced to a minimum.

It is also possible, according to the invention, to give the container plates shapes which are common in cooling tower contact bodies. Furthermore, the container plates can be cast.

It should be noted that merely incorporating into a counterflow cooling tower a structure which mixes cooling air saturated with steam and unsaturated cooling air will not always prevent the formation of fog or vapor. If the distance between the cooling tower contact body and the cooling air exit is rather small, it is impossible to obtain an adequate mixture of cooling air saturated with steam and unsaturated cooling air.

Thus, a further object of the invention is to design a counterflow cooling tower in such a way that, even when the distance between the cooling tower contact body and the cooling air exit is rather small, an adequate mixture of cooling air saturated with steam and unsaturated cooling air is still obtained.

The counterflow cooling tower which, according to the invention, solves the problem described above, further comprises a mixer installed above the spray nozzles. This theory can be applied to known counterflow cooling towers as well as to counterflow cooling towers comprising flow channel caps in accordance with the previously described embodiment of the present invention. The mixer, which is mounted between the cooling tower contact body and the cooling air exit, forces the cooling air saturated with steam and the unsaturated cooling air to mix by mechanical means which guide the air accordingly.

Also with respect to the theory involved in the invention as explained above, various possibilities exist with regard to design and equipment, as will be shown hereafter by way of example.

Counterflow cooling towers of the type in question are very often equipped with a precipitator between the cooling tower contact body and the cooling air exit. In that case it is advisable to turn the mixer according to the invention at the same time into a precipitator.

It is furthermore advisable, with regard to the counterflow cooling tower according to the invention, to arrange the mixer in the form of mixer banks, to embody the mixer banks in the form of building block elements with a number of channels, and to equip the channels with an inflow section, an outflow section and a baffle section. In order to yield a mixture of cooling air saturated with steam and unsaturated cooling air, the flow of saturated and unsaturated cooling air—is particularly effective when the outflow sections of the channels of the mixer banks leave the plane of the building block elements diagonally, and when those of adjacent mixing banks run in diagonally opposed directions or when the outflow sections of the channels of the mixer banks leave the plane of the building block elements at right angles and fit together in a roof-shaped fashion so that the outflow channels run in diagonally opposed directions.

According to the invention, the construction of the mixer banks is also entirely free. In particular, it will be possible to use synthetic materials.

Finally, another embodiment of the invention includes dividing walls which are attached to the flow channel caps; which run parallel to the spray nozzles.

The above description and further objects, features and advantages of the present invention will be apparent in the following detailed description of an illustrative embodiment thereof which is to be read in connection with the accompanying drawings, wherein.

Figure 1:
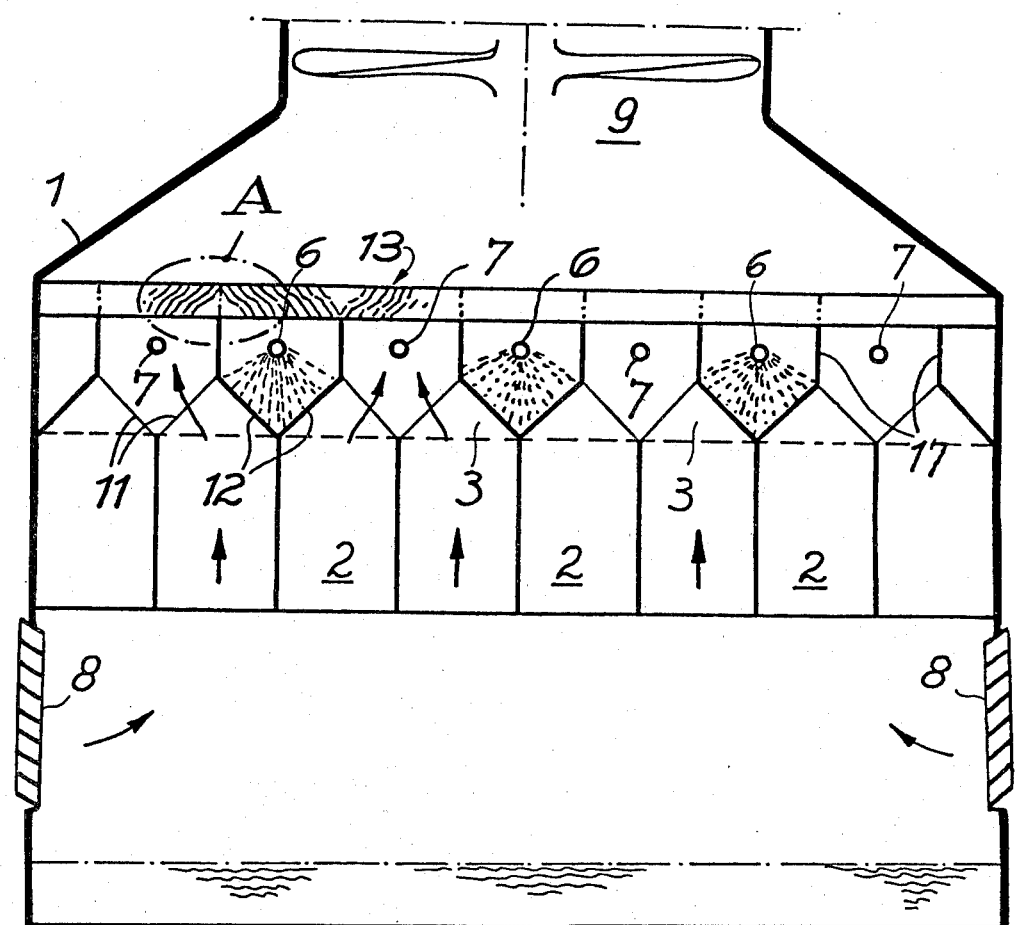
FIG. 1 is a vertical cross section of a counterflow cooling tower according to the invention.
Figure 3:
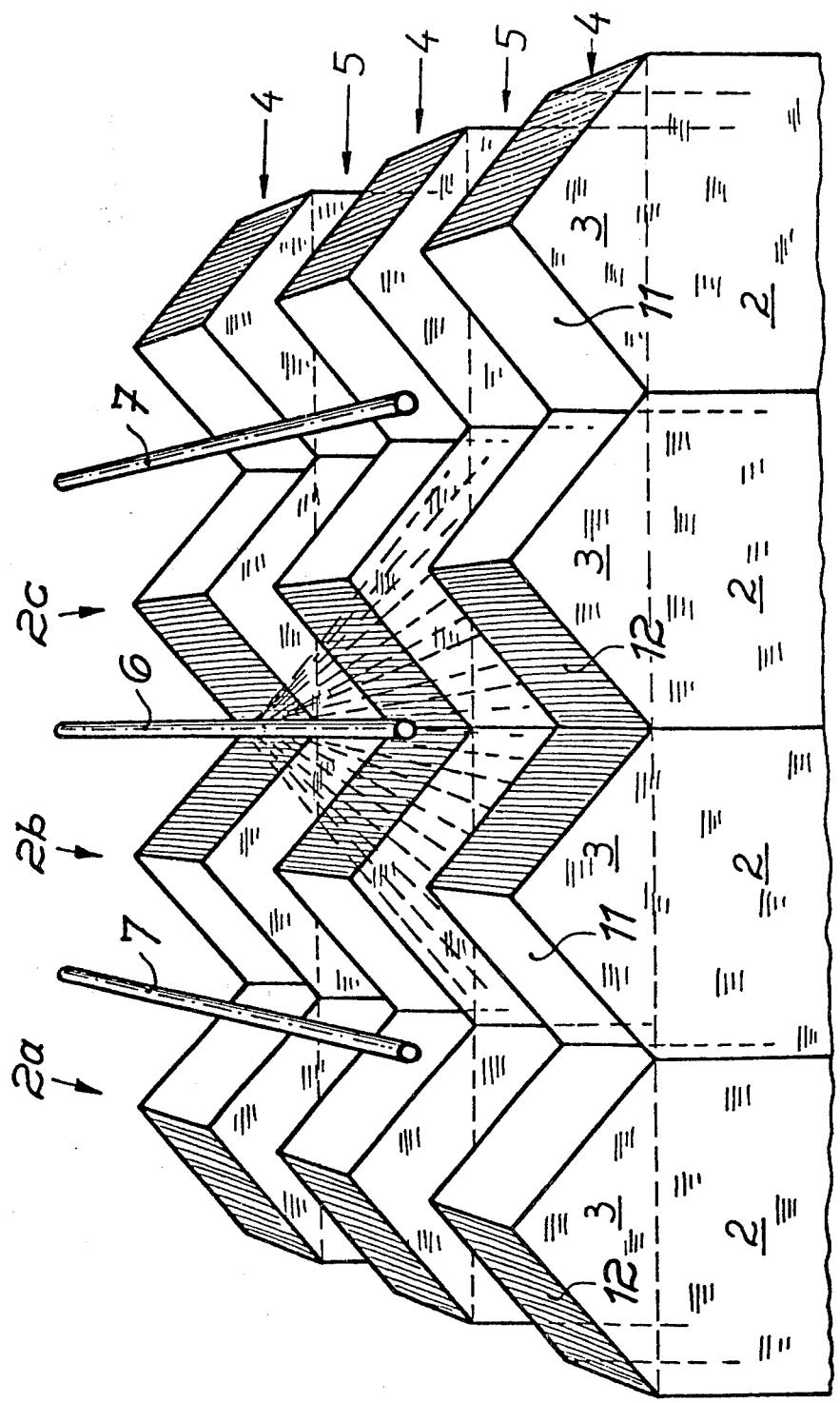
FIG. 3 is a section of the cooling tower contact body of the installation according to FIG. 1, on a considerably larger scale than FIG. 1 and in perspective.
Figure 4:
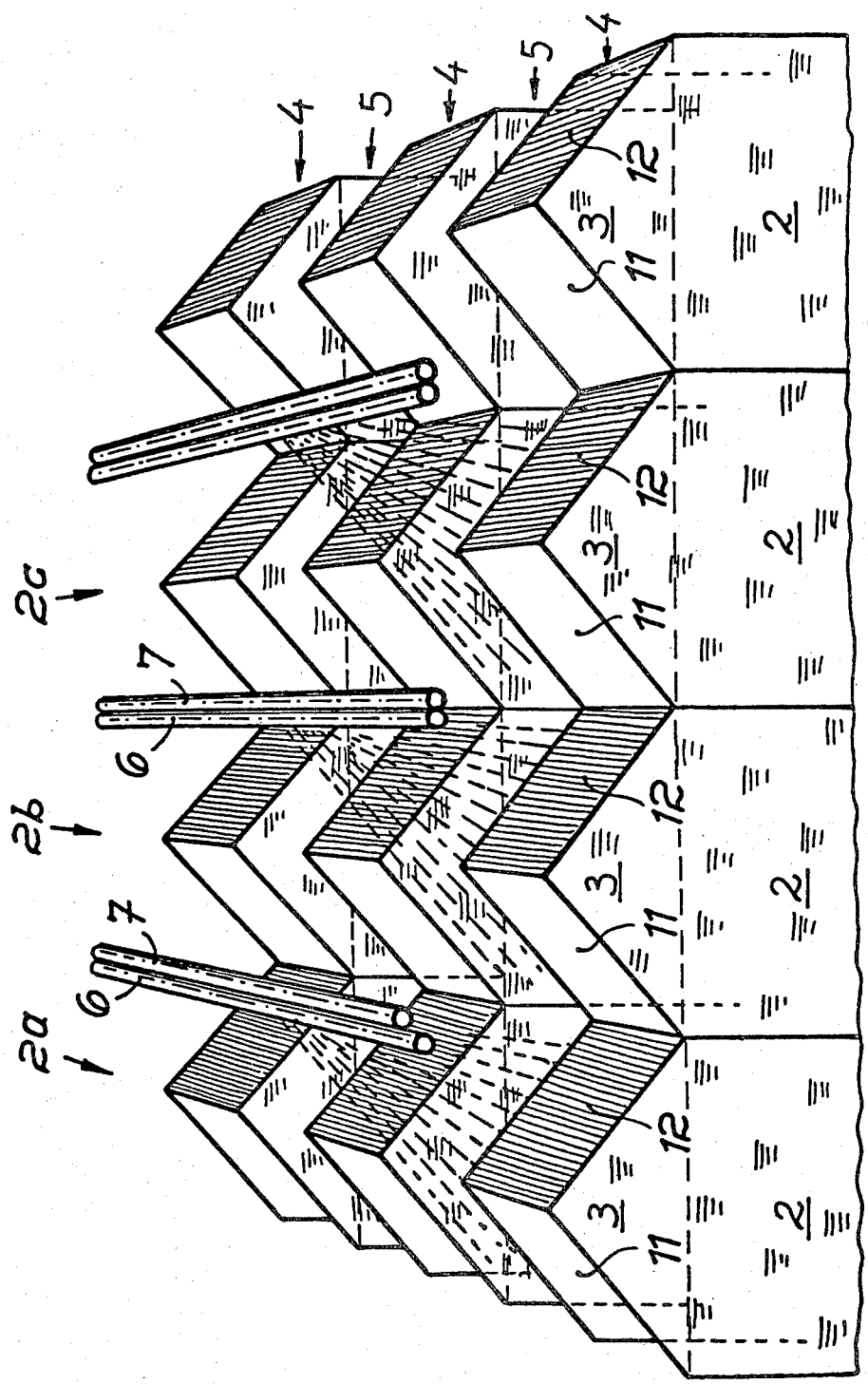

FIG. 4, which corresponds to FIG. 3, is another embodiment of a counterflow cooling tower according to the invention;

FIG. 5 is an enlarged version of Section A of the installation in FIG. 1; and

FIG. 6, which corresponds to FIG. 5, is still another embodiment of a counterflow cooling tower according to the invention.

Figure 2:
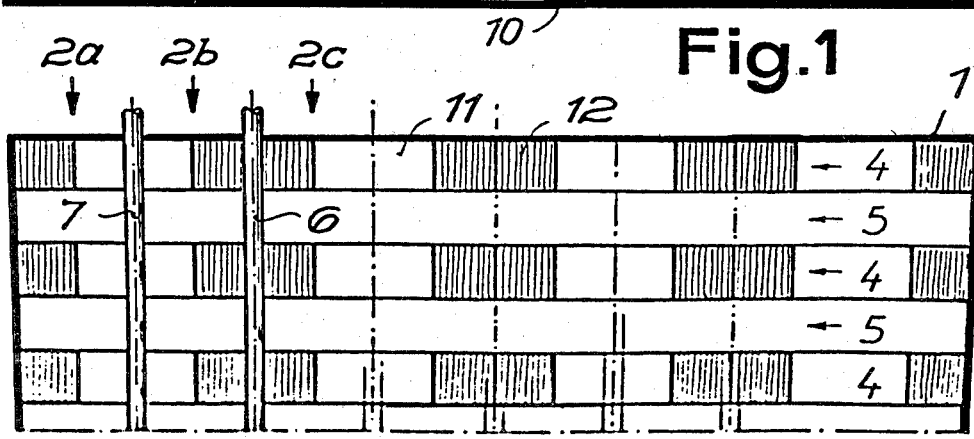
FIG. 2 is a view of part of the installation in FIG. 1.

Referring now to the drawings in detail, it should be noted that the counterflow cooling towers shown in the drawings are meant in particular for use as recooling cooling towers for steam generated power stations. As shown in FIGS. 1 and 2, the following elements are part of the basic structure: a cooling tower casing 1, a cooling tower contact body in the form of container plates or contact layers 2 and flow channel caps 3 with a number of flow channels 4 and 5, a water distribution installation with spray nozzles 6 and 7, controllable individually or in groups, for the water to be cooled, two entrances for cooling air 8 below, a cooling air exit 9 above and a basin for collecting the water 10. The flow of the cooling air is indicated on the drawings by means of arrows. A careful comparison of FIGS. 1 and 3 shows that the cooling tower contact body includes a number of container plates 2, installed with intermediate gaps and arranged in container plate banks 2a, 2b, 2c; the intermediate channels form the flow channels 4 and 5 for the cooling air. The flow channel walls formed by all of the flow channels 4 and 5 or alternatively by each second flow channel 4, can be sprinkled with the water to be cooled by means of the spray nozzles 6 and 7, or 6 alone. A careful comparison between FIGS. 1 and 3 reveals further that in the container plate banks 2a, 2b, 2c, each second flow channel 4 presents flow channel caps 3 to the water distribution installation—with an open side 11 and a closed side 12—whose walls are fitted at least geometrically to the corresponding container plates 2; in addition, the individual flow channel caps 3 of each container bank 2a, 2b and 2c are all open or closed on the same side and, in the area between the flow channel caps 3, spray nozzles 6 and 7 are installed which extend over the whole length of the container banks 2a, 2b and 2c.

In FIGS. 1 and 3, only spray nozzles 6 are shown functioning, they are activated when only alternately each second flow channel 4 has its flow channel walls exposed to the water to be cooled. When, on the other hand, all the spray nozzles 6 and 7 are activated, all the flow channel walls of the flow channels 4 and 5 will be sprinkled on.

In the embodiment shown in FIG. 1, the arrangement is such that the flow channel caps 3 of the adjacent container banks 2a, 2b and 2c face each other with, on one side, their open cap sides 11 and, on the other side, their closed cap sides 12. This arrangement can be different. We refer in this respect to FIG. 4. Here it can be seen that the flow channel caps 3 of the adjacent container banks 2a and 2b face each other with, on one side, an open cap 11 and, on the other side, a closed cap 12.

In this the embodiment shown in FIG. 4, two spray nozzles 6 and 7 are provided between adjacent flow channel caps 3 of the container plate banks 2a, 2b and 2c. If they function as shown in FIG. 4, it means once more that they are activated according to the setting whereby the flow channel walls of every second flow channel 4 are being sprinkled on. In the embodiment shown in FIG. 4, if the second spray nozzle 7 is also activated, water will be directed to the right of each spray nozzle 7 (with respect to the view shown in FIG. 4) so that the flow channel walls of each flow channel 4 and 5 will be sprinkled with water.

It is obvious that in the counterflow cooling tower according to the invention, the container plate banks 2a, 2b and 2c can be arranged with a different orientation vis-a-vis each other than is shown in the figures. In particular, the container plate banks 2a, 2b and 2c, with the arrangement of the flow channel caps 3 as described, can be installed with a different orientation of the flow channel caps 3 and, at the same time, with a chequerboard arrangement vis-a-vis each other.

As shown in FIG. 1, in the embodiment represented, a mixer 13 has been installed above the spray nozzles 6 and 7, which functions at the same time as a precipitator. When observed in detail, as shown in FIGS. 5 and 6, the mixer 13 appears to consist of mixer banks 13a and 13b. The mixer banks 13a and 13b are embodied as building block elements with a number of channels, with the channels consisting of an inflow section 14, an outflow section 15, and a baffle section 16. In the embodiment according to FIG. 5, the outflow sections 15 of the channels of the mixer banks 13a and 13b, leave the plane of the building block elements diagonally, so that the outflow sections of mixer bank 13a and mixer bank 13b run in diagonally opposed directions. In the embodiment according to FIG. 6, the outflow sections 15 of the channels of the mixer banks 13a and 13b, leave the plane of the building block elements at right angles, and the mixer banks 13a and 13b are fitted in a roof-shaped fashion in such a way that the outflow sections 15 of the channels run in diagonally opposed directions.

One spray nozzle is sufficient for two container plates. The width of the flow channels is a parameter which can be freely selected and varied according to the layout of the counterflow cooling tower.

The details of the invention can be realized in various ways; we will only mention a few hereafter by way of examples.

First of all, the preferred embodiment of the invention is characterized by the fact that the flow channel caps of adjacent container plate banks face each other with, on one side, open cap sides and, on the other side, closed cap sides. This makes it possible to use spray nozzles which sprinkle on both sides of a perpendicular on the longitudinal axis of the nozzles. It is also possible to create an arrangement whereby the flow channel caps of adjacent container plate banks face each other with, on one side, an open cap and, on the other side, a closed cap. In this case, the spray nozzles have to be arranged in such a way that, when only the flow channel sides of every second flow channel need to be sprinkled, they will only sprinkle in the direction of the open cap sides of the flow channel caps.

According to the invention, it is not only possible to select freely the width of the flow channels, it is also possible to simplify the incorporation of the flow channels. In this respect, the preferred embodiment of the invention is characterized by the fact that every two container plates with the corresponding flow channel caps form a single container unit, that the container units are installed with intermediate gaps and that these intermediate gaps form cap-free flow channels.

According to the invention the construction of the container plates is entirely free. In particular, it will be possible to use synthetic materials.

Furthermore, the mixer banks 13a and 13b may be made of contoured synthetic panels.

Finally, FIG. 1 shows also how dividing walls 17, running parallel to the spray nozzles 6 and 7, have been attached to the flow channel caps 3.

I claim:

1. A counterflow cooling tower comprising a casing having cooling air inlet openings formed at its lower end and cooling air outlet openings formed at its upper end; a contact body positioned in said casing and formed from a plurality of contact layers arranged in banks and defining a plurality of water and air flow channels therebetween providing communication between said air inlet and outlet openings; means positioned above said contact body for supplying warm water to be cooled to said channels; channel caps on top of only some of said channels fitted geometrically to adjacent contact layers, said channel caps covering some of said channels against water from said means for supplying warm water; said means for supplying warm water comprising elongated spray nozzles installed in the areas between the channel caps and running at an angle to the channels over the extent of the banks; and means for supplying cooling air from said air inlet openings through substantially all of said channels to said air outlet openings, whereby the temperature and moisture-content of air supplied to the channels to which warm water is supplied are increased while the temperature of air supplied to the other channels is increased by heat transfer through adjacent layers of the contact body without substantially changing the moisture-content thereof.

2. A counterflow cooling tower as defined in claim 1, wherein each of said channel caps includes an open side and a closed side and said channel caps are arranged so that open sides of adjacent channel caps are adjacent each other and closed sides of adjacent channel caps are adjacent each other.

3. A counterflow cooling tower as defined in claim 1, wherein in each of said channel caps includes an open side and a closed side and said channel caps are arranged so that the open side of one of said channel caps is adjacent the closed side of an adjacent channel cap.

4. A counterflow cooling tower as defined in claim 1, wherein pairs of adjacent contact layers covered by channel caps form undivided container units, adjacent container units having intermediate gaps therebetween which define cap-free flow channels.

5. A counterflow cooling tower as defined in claim 1, 2, 3 or 4, which further comprises means interposed between said contact body and said air outlet openings for mixing air passed through said water-free flow channels with air passed through said water-supplied flow channels.

6. A counterflow cooling tower as defined in claim 5, wherein said air mixing means further functions as a precipitator.

7. A counterflow cooling tower as defined in claim 5, wherein said air mixing means is arranged in banks, each of which includes at least one block element having formed therein a plurality of channels, each channel of said block element including an inflow portion, an outflow portion, and a baffle portion interposed therebetween.

8. A counterflow cooling tower as defined in claim 7, wherein said outflow portion of said block element channels are disposed diagonally to the principal plane in which said block element lies and in a direction opposite to that of said outflow portions of an adjacent block element.

9. A counterflow cooling tower as defined in claim 7, wherein said outflow portions of said block element channels are disposed substantially perpendicular to the principal plane in which said block element lies and wherein block elements of adjacent banks fit together in a roof-shaped fashion in such a way that said outflow portions of adjacent block elements run in diagonally opposed directions.

10. A counterflow cooling tower as defined in claim 5, wherein said air mixing means is constructed from a plurality of contoured synthetic panels.

11. A counterflow cooling tower as defined in claim 1, which further comprises a plurality of dividing walls, each of which is attached to a corresponding flow channel cap and which extends parallel to said water supply means.

* * * * *